United States Patent [19]
Hamada et al.

[11] Patent Number: 5,144,355
[45] Date of Patent: Sep. 1, 1992

[54] CAMERA HAVING AUTOMATIC FOCUS ADJUSTING APPARATUS

[75] Inventors: Masataka Hamada; Tokuji Ishida, both of Osaka, Japan

[73] Assignee: Minolta Camera Kabushiki Kaisha, Osaka, Japan

[21] Appl. No.: 661,229

[22] Filed: Feb. 27, 1991

[30] Foreign Application Priority Data

May 16, 1988 [JP] Japan ................. 63-118634

[51] Int. Cl.$^5$ .................................. G03B 3/10
[52] U.S. Cl. ..................... 354/400; 354/430
[58] Field of Search ............ 354/400, 402, 403, 408, 354/409, 430

[56] References Cited

U.S. PATENT DOCUMENTS 4,464,037  8/1984  Terui et al. ................. 354/400
4,860,045  8/1989  Masatakahamada et al. ...... 354/408

Primary Examiner—W. B. Perkey
Assistant Examiner—Cassandra C. Spyrou
Attorney, Agent, or Firm—Burns, Doane, Swecker & Mathis

[57] ABSTRACT

An automatic focus adjusting apparatus of a camera having an AF lock function in which driving of a lens is prohibited after detection of an in-focus state comprises determining apparatus for determining whether or not the lens is at the in-focus point and a controller for controlling the camera such that the exposure is not carried out until the lens is driven to the in-focus point when it is determined that the lens is in an out-of-focus state and a shutter release button is pressed. In the case of the object is moving, the lens is kept driven by the movement of the object in response to the operation of the shutter release button even if the in-focus state is once realized and the AF lock is carried out.

12 Claims, 11 Drawing Sheets

| | NAME | ELEMENT AREA | DIFFERENTIAL DATA | LEFT END ELEMENT OF REF. PART EMPLOYED FOR CORRELATING CALCULATION | RANGE OF DETECTABLE DEVIATION BETWEEN IMAGES (Max.) |
|---|---|---|---|---|---|
| BASIC PART (L) | 1st BLOCK (I) | $l_1 \sim l_{20}$ | $lS_1 \sim lS_{16}$ | r5 (rs5) | −4 ~ 14 PITCH |
| | 2nd BLOCK (II) | $l_{11} \sim l_{30}$ | $lS_{11} \sim lS_{26}$ | r15 (rs15) | −8 ~ 8 PITCH |
| | 3rd BLOCK (III) | $l_{21} \sim l_{40}$ | $lS_{21} \sim lS_{36}$ | r25 (rs25) | −14 ~ 4 PITCH |
| REFERENCE PART (R) | WHOLE | $r_1 \sim r_{48}$ | $rs_1 \sim rs_{44}$ | | |

CAMERA HAVING AUTOMATIC FOCUS ADJUSTING APPARATUS

This application is a continuation of application Ser. No. 07/352,289, filed May 15, 1989.

BACKGROUND OF THE INVENTION

1. Field of the Invention

The present invention relates to an automatic focus adjusting apparatus in which light reflected from an object passed through a photographic lens of a camera is received to detect the in-focus state of the photographic lens to carry out focus adjustment. More specifically, the present invention relates to an automatic focus adjusting apparatus which is capable of adjusting focus even if the object is moving.

2. Description of the Related Art

Focus adjusting apparatuses employing phase difference detecting method have been proposed. FIG. 11 is a schematic diagram showing such kind of optical system. Referring to FIG. 11, in the focus detecting apparatus employing the phase difference detecting method, luminous bundle from an object passing through first and second areas of a photographic lens, which areas are in symmetry about an optical axis, are respectively reformed to provide two images. Amount and direction of deviation of the image forming position from the intended focusing position (whether the image forming position is in front of or behind the intended focusing position, that is, whether it is in the front focus state or rear focus state) are known from relative positions of the two images.

The optical system comprises a photographic lens 2, a condenser lens 6 positioned at an intended focal plane 4 behind the photographic lens 2 or further behind the plane, and image reforming lenses 8 and 10 positioned further therebehind. Image sensors 12 and 14 having CCDs as photosensitive elements are arranged on image forming planes of the image reforming lenses 8 and 10. Images on the image sensors 12 and 14 come close to each other near the optical axis 18 when the image of the object to be focused is formed in front of the intended focusing plane, that is, in the so called front focus state. On the contrary, in the so called rear focus state, the images go away from the optical axis 18. In the in-focus state, corresponding two points of the two images are spaced from each other by a prescribed distance defined by the structure of the optical system of the focus detecting apparatus. Therefore, theoretically, the state of focus can be known by detecting the distance between the corresponding two points of the two images.

In an automatic focus adjusting apparatus of a camera containing a focus detecting optical system of the above described type, sequential control is carried out in accordance with a program by a control circuit including a microcomputer, the sequence comprising accumulation of charges corresponding to the light intensity from the object in a CCD image sensor, focus detecting operation (calculation of the amount of defocus) employing outputs from the CCD image sensor, driving of a focusing lens (not shown) of photographic lens 2 in correspondence with the amount of defocus, and stopping of the focusing lens at the in-focus position (releasing of the shutter mechanism . . . when the shutter button is pressed).

The automatic focus adjusting apparatus continuously carries out the above described sequential automatic focus adjusting control when the object image comes near the in-focus state, and carries out continuous AF (automatic focus adjusting) operation, so that exact in-focus position can be set.

The above described automatic focus adjusting apparatus exhibits the following drawback when the object is moving toward or away from the camera. Namely, when the amount of defocus is detected by one focus detecting operation and the focusing lens is moved to the in-focus position based on the amount of defocus, the object image is not in the in-focus state actually, since the object moves during the operation.

FIG. 13 is a graph illustrating the above described state. The abscissa represents time and the ordinate represents the amount of defocus on the film surface.

In the figure, the curve 1 represents the increase of the defocus amount on the film surface when the object moves toward the camera, and the line m is a trace of positions on which images are formed by the photographic lens. The central points A, B, C . . . of the time of accumulation are the time points at which the data of the object are read in. The first central point of accumulation is represented by $T_0$ in FIG. 13. The central point of accumulation means the central time point of the time period required for CCD accumulation for determining the focus state. The amount of defocus at this time is represented by $D_0$. The time period from $T_0$ to $T_1$ is the time period from the central point of accumulation to the end of accumulation and a time period required for the focus detecting operation. The time $T_1$ to $T_2$ is the time period for driving the lens. When the driving of the lens is completed, the lens is stopped and the next accumulation ($T_2$ to $T_3$) and the next operation ($T_3$ to $T_4$) are carried out. At the time point when the lens is stopped, the object has already moved and therefore there is a defocus of ($D_1 - D_0$) as compared with the time $T_0$. The data of the object is taken again at the time period $T_3$, the amount of defocus ($D_2 - D_0$) is calculated, and the driving of the lens is completed at the time period $T_5$. As this time, the object image has already moved, so that even if the lens is driven ($T_5$), there is a further amount of defocus ($D_3 - D_2$), which amount of defocus is larger than that at the point $T_2$. In the similar manner, the amount of defocus increases as the time passes ($T_8$, $D_5 - D_4$), ($T_{11}$, $D_7 - D_6$), going away from the in-focus state. Namely, although the AF operation has been carried out, the amount of defocus increases continuously, disabling releasing in the in-focus state.

The delay in tracking in the AF control becomes a serious problem especially when an interchangeable lens having longer focal length such as telephoto lens is used, since the focusing speed is slow.

In a so called one shot AF camera, in which the driving of the lens is stopped after the in-focus state is once obtained (AF lock), the amount of defocus increases continuously as the object moves until the shutter releasing operation is carried out (the time period is not constant), so that automatic focus adjustment cannot be carried out for a moving object.

SUMMARY OF THE INVENTION

Therefore, one object of the present invention is to carry out automatic focus adjustment on a moving object in a camera having an automatic focus adjusting apparatus.

Another object of the present invention is to place a lens at the in-focus position at the time of exposure when the object is moved, even if the lens has been AF locked, in a camera having automatic focus adjusting apparatus.

A further object of the present invention is to enable provision of an in-focus photograph by expecting the movement of the object when the object is moving, in a camera having an automatic focus adjusting apparatus.

The above described object of the present invention can be attained by a camera having an automatic focus adjusting apparatus of the present invention, comprising: a focus detecting apparatus for detecting focusing condition of a photographic lens to output a focus signal; a driving apparatus for driving the photographic lens toward an in-focus point; a determining apparatus for determining whether or not the photographic lens is at a position which can be regarded as the in-focus point, based on the focus signal, the operation of the driving apparatus stopped when it is determined by the determining apparatus that the photographic lens is at the in-focus point; a manual operating member; an exposure controlling apparatus for controlling exposure in response to the manual operation to the manual operating member; a controller for operating the exposure controlling apparatus when the manual operating member is manually operated with the determining apparatus determining that the photographic lens is at the in-focus point, and for operating the driving apparatus based on the focus signal and thereafter operating the exposure controlling apparatus after end of the operation of the driving apparatus, when the manual operating member is operated with the determining apparatus determining that the photographic lens is at an out-of-focus point.

The camera having the automatic focus adjusting apparatus in accordance with the present invention comprises the above described components. Since the object is moving, the photographic lens is moved to the in-focus point before the actual releasing operation, when it is determined that the lens is not at the in-focus point in releasing. Therefore, at the time of releasing, an in-focus photograph can be taken. Consequently, automatic focus adjustment is carried on a moving object in a camera having an automatic adjusting apparatus.

According to another aspect of the present invention, the camera having the automatic focus adjusting apparatus comprises: a focus detecting apparatus for detecting focusing condition of a photographic lens to output a focus signal; a driving apparatus for driving the photographic lens to the in-focus point; a manual operating member; an exposure controlling apparatus for controlling exposure in response to manual operation to the manual operating member; a determining apparatus for determining whether or not the photographic lens is at the in-focus state, based on the focus signal; moving object determining apparatus for determining whether or not the object is moving based on the focus signal, when the manual operating member is manually operated with the determining apparatus determining that the photographic lens is at an out-of-focus point; a calculating apparatus for estimating the in-focus point at the time of exposure control when the moving object determining apparatus determines that the object is moving, and for calculating an amount of driving the lens to drive the photographic lens to the in-focus point; and a control apparatus for operating the driving apparatus based on the calculated lens driving amount and operating the exposure controlling apparatus after the end of operation of the driving apparatus.

The camera having automatic focus adjusting apparatus of the present invention comprises the above described components. When the moving object determining apparatus determines that the object is moving, an in-focus point of the lens at the time of exposure is estimated and the lens is moved thereto. Therefore, even if the object is moving, the lens is set at the in-focus point at the time of exposure. Consequently, it becomes possible to take in-focus photograph by expecting the movement of the subject, when the subject is moving, in a camera having an automatic focus adjusting apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be hereinafter described with reference to the figures.

I. System structure of an automatic focus adjusting apparatus

Figure 9:
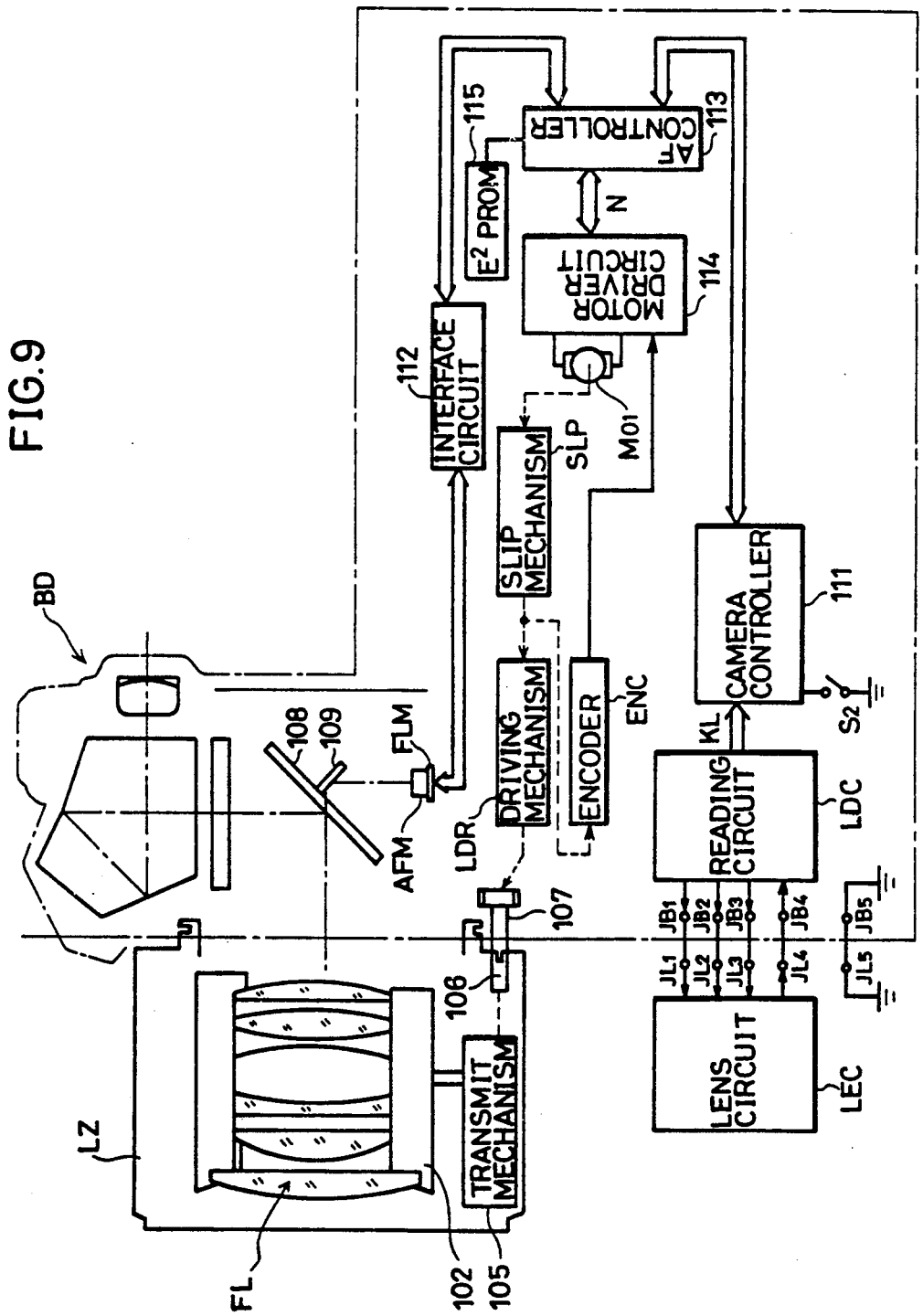
FIGS. 9 and 10 are block diagrams showing a whole structure of a camera system to which the present invention is applied.

Referring to FIG. 9, a camera to which the present invention is applied comprises an interchangeable lens unit LZ and a camera body BD, which is surrounded by a chain dotted line. The lens unit LZ and the body BD are connected to each other mechanically by clutches 106, 107 and electrically by connecting terminals JL1-JL5, JB1-JB5. In the camera system, an optical system is adapted such that the light reflected from an object passes through a lens system in the interchangeable lens unit LZ and a semi-transparent portion at the center of a reflecting mirror 108 in the camera body BD, and the light is reflected by a submirror 109 to be received by a CCD image sensor FLM.

An interface circuit 112 is provided for driving the CCD image sensor FLM in a focus detecting module AFM, dumping data in association with the object from the CCD image sensor FLM and for transmitting the data to an AF controller 113.

An EEPROM 115 connected to the AF controller 113 is a memory in which data are maintained even if the power supply is OFF. The AF controller 113 calculates an amount of defocus $|\Delta L|$ indicative of the amount of deviation from the in-focus position and a direction of defocus based on signals from the CCD image sensor FLM. A motor MO1 is driven based on these signals, and the power of rotation thereof is transmitted to the interchangeable lens unit LZ through a slip mechanism SLP, a driving mechanism LDR and a clutch 107 on the camera body BD. The slip mechanism SLP is provided to avoid a load on the motor MO1, when a portion which is moved in the interchangeable lens unit LZ receives a torque higher than a prescribed level to cause a slip.

A transmitting mechanism 105 is connected to the clutch 106 on the lens unit LZ side, and focus adjustment is carried out by the movement of a focusing lens FL in the axial direction by the transmitting mechanism 105. An encoder ENC for monitoring an amount of driving of the motor MO1 driving the interchangeable lens unit LZ is coupled to a driving mechanism LDR in the camera body BD, and the encoder ENC outputs pulses, whose number corresponds to the amount of driving of the motor MO1 driving the interchangeable lens unit LZ.

Now, when we represent the number of rotation of the motor by NM (rot), the number of pulses from the encoder ENC by N, the precision of the encoder by (1/rot), reduction ratio in the mechanical transmitting system from the rotary axis of the motor MO1 to a fitting axis of the encoder ENC by $\mu P$, the reduction ratio of the mechanical transmitting system from the rotary axis of the motor MO1 to the clutch 107 on the side of the camera body by $\mu B$, the reduction ratio of the mechanical transmitting system from the clutch 106 on the lens side to the lens system by $\mu L$, a helicoid lead of a focus adjusting member 102 by LH (mm/rot) and the amount of movement of the focusing lens FL by $\Delta d$ (mm), the following relation can be applied.

$$N = \rho \cdot \mu P \cdot NM$$

$$\Delta d = NM \cdot \mu B \cdot \mu L \cdot LH$$

therefore, $$\Delta d = N \cdot \mu B \cdot \mu L \cdot LH / (\rho \cdot \mu P) \quad (1)$$

When we represent the ratio of the amount of movement $\Delta L$ (mm) on the image forming plane to the said amount d when the lens is moved by $\Delta d$ (mm) by the following equation $$Kop = \Delta d / \Delta L \quad (2)$$

then the following relation can be applied from the equations (1) and (2). Namely, $$N = Kop \cdot \Delta L \cdot \rho \cdot \mu P / (\mu B \cdot \mu L \cdot LH) \quad (3)$$

Now, let us assume that $$KL = Kop / (\mu L \cdot LH) \quad (4)$$

$$KB = \rho \cdot \mu P / \mu B \quad (5)$$

then the following equation can be applied.

$$N = KB \cdot KL \cdot \Delta L \quad (6)$$

In the equation (6), the amount $\Delta L$ can be provided from the AF controller 113 as signals indicative of the amount of defocus $|\Delta L|$ and the direction of defocus.

The term KB in the equation (5) is data fixedly determined in accordance with the above mentioned reduction ratio $\mu B$, which data KB is stored in a camera controller 111.

From a reading circuit LDC on the side of the camera body BD to a lens circuit LEC on the lens side applied are the electric power, clock pulses for synchronization and read start signal through respective terminals JB1, JL1, JB2, JL2, JB3 and JL3. Data KL is serially outputted through terminals JL4, JB4 from the lens circuit LEC to the reading circuit LDC. The terminals JB5 and JL5 are common ground terminals. When the read start signal is inputted through the terminals JB3 and JL3 to the lens circuit LEC, the data KL is outputted serially to the reading circuit LDC in synchronization with clock pulses inputted from the camera body BD through the terminals JB2 and JL2. The reading circuit LDC reads the serial data from the terminal JB4 to convert the same to parallel data based on the clock pulses which are the same as the clock pulses outputted to the terminal JB2.

The camera controller 111 calculates $KL \cdot KB = K$ based on the data KL from the reading circuit LDC and the internal data KB. The AF controller 113 calculates the amount of defocus $|\Delta L|$ using the data of the object image transmitted from the interface circuit 112. Based on the amount of defocus $|\Delta L|$ and on the data K from the camera controller 111, the calculation of $$K \cdot |\Delta L| = N$$

is carried out. Consequently, the number of pulses to be detected by the encoder ENC is calculated. The AF controller 113 rotates the motor MO1 in clockwise or counter clockwise direction by means of a motor driver circuit 114 in response to a signal indicative of the direction of defocus calculated by using the data of the object image. At the time when the number of pulses inputted from the encoder reaches the calculated value N in the AF controller 113, it is determined that the focusing lens FL of the interchangeable lens unit LZ has moved the amount of movement $\Delta d$ to the in-focus position, so that the rotation of the motor MO1 is stopped.

In the foregoing, the value $$K = KL \cdot KB$$

was calculated by multiplying the data KB by the data KL from the interchangeable lens unit LZ, with the data KB fixedly stored in the camera body KB. The method of calculation of the value K is not limited to the above mentioned method. For example, when the interchangeable lens unit LZ can be attached to a plurality of camera bodies having different data KB, the value K may be calculated in the following manner. Namely, the data corresponding to a camera body BD having a specified KB1 value, that is, $$K1 = KL \cdot KB1$$

is outputted from the lens circuit LEC in the interchangeable lens unit LZ in accordance with the a focal length of the lens LZ. Meanwhile, in the specified camera body, the calculation of $KL \cdot KB$ using the data KB in the camera controller 111 is not carried out. Alternatively, the data K1 from the reading circuit LDC is inputted to the AF controller 111. When the said lens is to be attached to another camera body having a different value KB2 ($\neq$KB1), then the data $$KX = KB2 / KB1$$

is held in the camera controller 111. The value $KL \cdot KB2$ is calculated in accordance with the following equation.

$$K2 = K1 \cdot KB2 / KB1 = KL \cdot KB2$$

Especially when a zoom lens in which the focusing lens is arranged in front of the zooming lens is employed, then the value Kop will be $$Kop = (fl/f)^2 \qquad (7)$$

where
fl: focal length of the focusing lens FL
f: total focal length in taking photograph.

Therefore, the value KL or K for a zoom lens changes widely. In such case, the data KL or K stored in the lens is divided into data of exponent and data of significant figures (for example, if the data comprises 8 bit, then higher 4 bit are allotted to the exponent part and the lower 4 bits are allotted to the significant figure part), and out of the data read by the reading circuit LDC in the camera body, only the lower 4 bit data may be shifted by the data of the exponent part inputted to the camera controller 111. If such method is employed, there will be no problem if the value KL or K changes widely. A release switch $S_2$ is connected to the camera controller.

In the above description of FIG. 9, the apparatus of the present invention is shown as structured by an assembly of circuit blocks in order to facilitate understanding of the function and operation of the present invention. The functions of the respective circuit blocks are in most cases achieved by microcomputers as will be described later.

Figure 10:
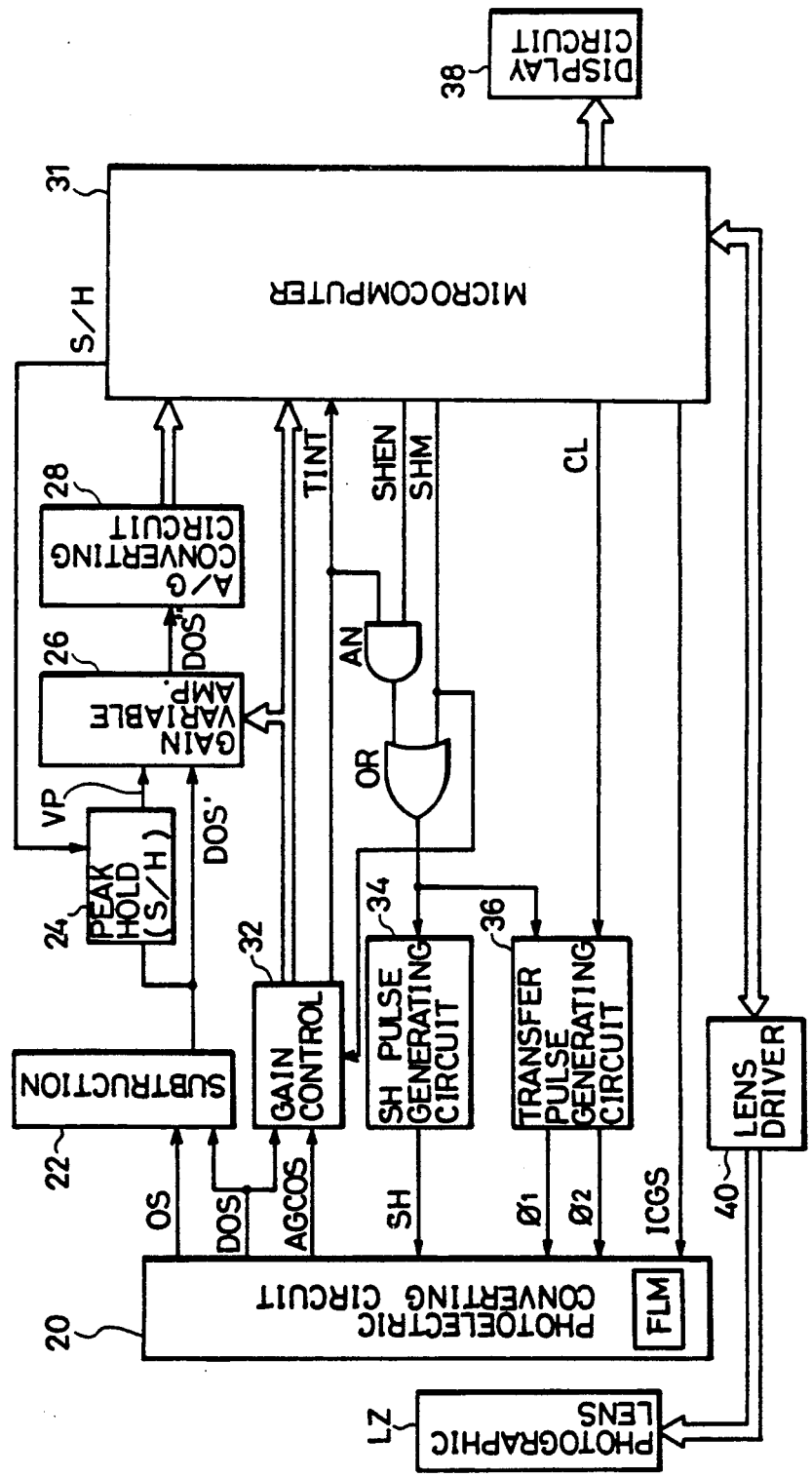
Figure 11:
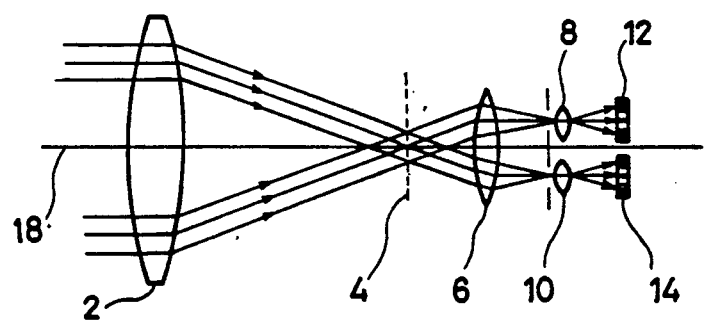
FIGS. 11 to 13 illustrate conventional optical system of an automatic focus detecting apparatus.
Figure 12:
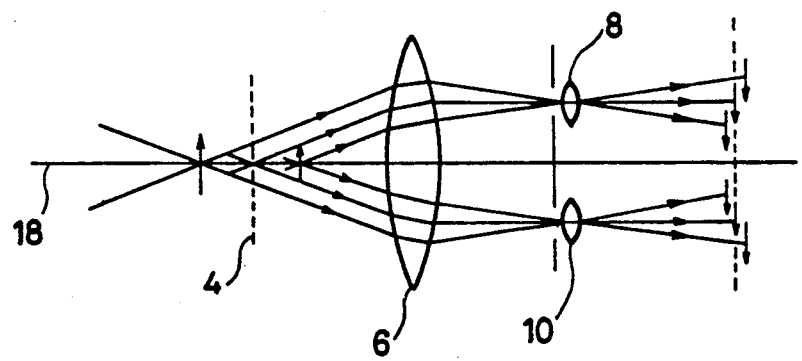
Figure 13:
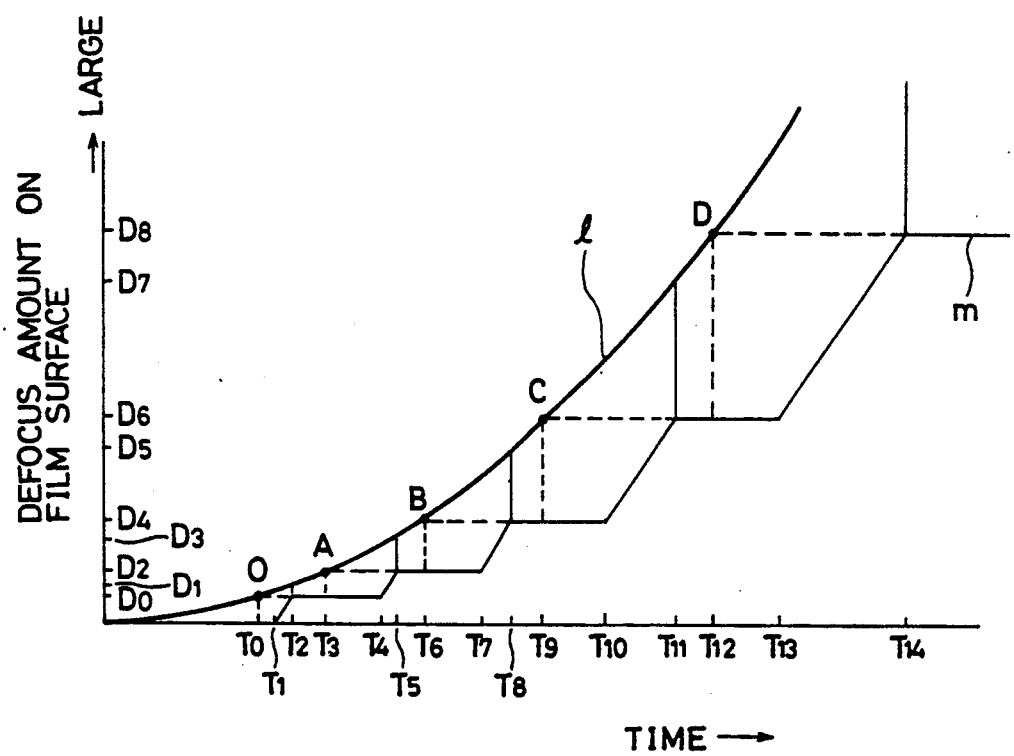

A block diagram showing the whole structure of the focus detecting control circuit in accordance with the present invention is shown in FIG. 10.

Referring to FIG. 10, the control circuit 31 formed of microcomputer starts its focus detecting operation when a shutter release button, not shown, is closed by a first stroke of depression with a focus detecting mode switch (not shown) being on.

At first, pulsewise accumulation clearing signal ICGS is outputted from the control circuit 31 to a CCD image sensor FLM including first and second arrays of photoelectric converting elements provided in a photoelectric converting circuit 20. Respective elements in the CCD image sensor FLM are reset at the initial state by this signal, and an output AGCOS of a brightness monitoring circuit (not shown) included in the CCD image sensor is set at the supply voltage level. At the same time, the control circuit 31 outputs a "high" level shift pulse generation permitting signal SHEN. At the same time as the accumulation clearing signal ICGS goes out, a charge accumulation is started in each element in the CCD image sensor FLM and the output AGCOS from the brightness monitoring circuit in the CCD image sensor FLM begins to decrease at a speed corresponding to the brightness of the object. A reference signal output DOS from a reference signal generating circuit included in the photoelectric converting circuit 20 is kept at a constant reference level. A gain control circuit 32 compares AGCOS with DOS and controls the gain AGC of a gain variable differential amplifier 26 in accordance with how much AGCOS decreases compared with DOS in a prescribed time period (in focus detection, 100 msec). If it is detected that AGCOS is decreased by more than a prescribed level compared with DOS in the prescribed time period after the disappearance of the accumulation clearing signal ICGS, the gain control circuit 32 outputs a "high" level TINT signal. The TINT signal passes through an AND circuit AN and an OR circuit OR to be inputted to the shift pulse generating circuit 34, and a shift pulse SH is outputted from this circuit in response to the signal. When the shift pulse SH is inputted to the photoelectric converting circuit 20, the charge accumulation by each of the elements in the CCD image sensor FLM is terminated, and the charges corresponding to the accumulated value are transmitted in parallel to the corresponding cells in the shift register in the photoelectric converting circuit 20 from the CCD image sensor. Meanwhile, based on the clock pulse CL from the control circuit 31, two sensor driving pulses $\phi 1$ and $\phi 2$ having their phases shifted by 180° from each other are outputted from a transfer pulse generating circuit 36 to be inputted to the photoelectric converting circuit 20. The photoelectric converting circuit 20 serially shifts the charges in each of the pixels of the CCD shift register one by one in synchronization with the rise of each pulse $\phi 1$ out of the sensor driving pulses $\phi 1$ and $\phi 2$, so that OS signals constituting image signals are successively outputted. The voltage of the OS signal becomes higher as the incidental intensity to the corresponding photoelectric element is lower. A subtracting circuit 22 subtracts the OS signal from the above described reference signal DOS and outputs the result as the pixel signal. If the TINT signal is not outputted in the prescribed time period after the extinction of the accumulation clearing signal ICG, then the control circuit 31 outputs a "high" level shift pulse generation instructing signal SHM. Therefore, when the "high" level TINT signal is not outputted from the gain control circuit 32 in a prescribed time period after the extinction of the accumulation clearing signal ICG, the shift pulse generating circuit 34 generates the shift pulse SH in response to the shift pulse generation instructing signal SHM.

In the above described operation, the control circuit 31 outputs sample hold signal S/H when pixel signals corresponding to the seventh to tenth pixels of the CCD image sensor FLM are outputted. The portion corresponding to these signals of the CCD image sensor is masked by aluminum in order to remove dark current, which portion corresponds to the photosensitive pixels of the CCD image sensor which are in a shading state. Meanwhile, a peak hold circuit 24 maintains a difference between the reference DOS with the output OS corresponding to the masked portion of the CCD image sensor in the photoelectric converting circuit 20 by the sample hold signal, and the difference output VP and the pixel signal DOS' are thereafter inputted to the gain variable amplifier 26. The gain variable amplifier 26 amplifies the difference between the pixel signal and the difference output by a gain controlled by the gain control circuit 32, and the amplified output DOS" is A/D converted by an A/D converter 28 to be inputted to the control circuit 31 as pixel signal data. Although the A/D conversion in the A/D converting circuit 28 is carried out by 8 bit unit, the transfer of the data is carried out by higher and lower 4 bit units, respectively to the control circuit 31.

Thereafter, the control circuit 31 stores the pixel signal data successively in an internal memory. When the data corresponding to all the pixels in the CCD image sensor have been stored, the data are processed in accordance with a prescribed program, and the amount and direction of defocus are calculated. A display circuit 38 displays the calculated amount and the direction, and the lens driving apparatus 40 is driven in accordance with the amount and direction of defocus to automatically adjust focus of the photographic lens LZ.

II. Automatic focus adjusting method

<II-1> flow chart of automatic focus adjustment

Figure 1:
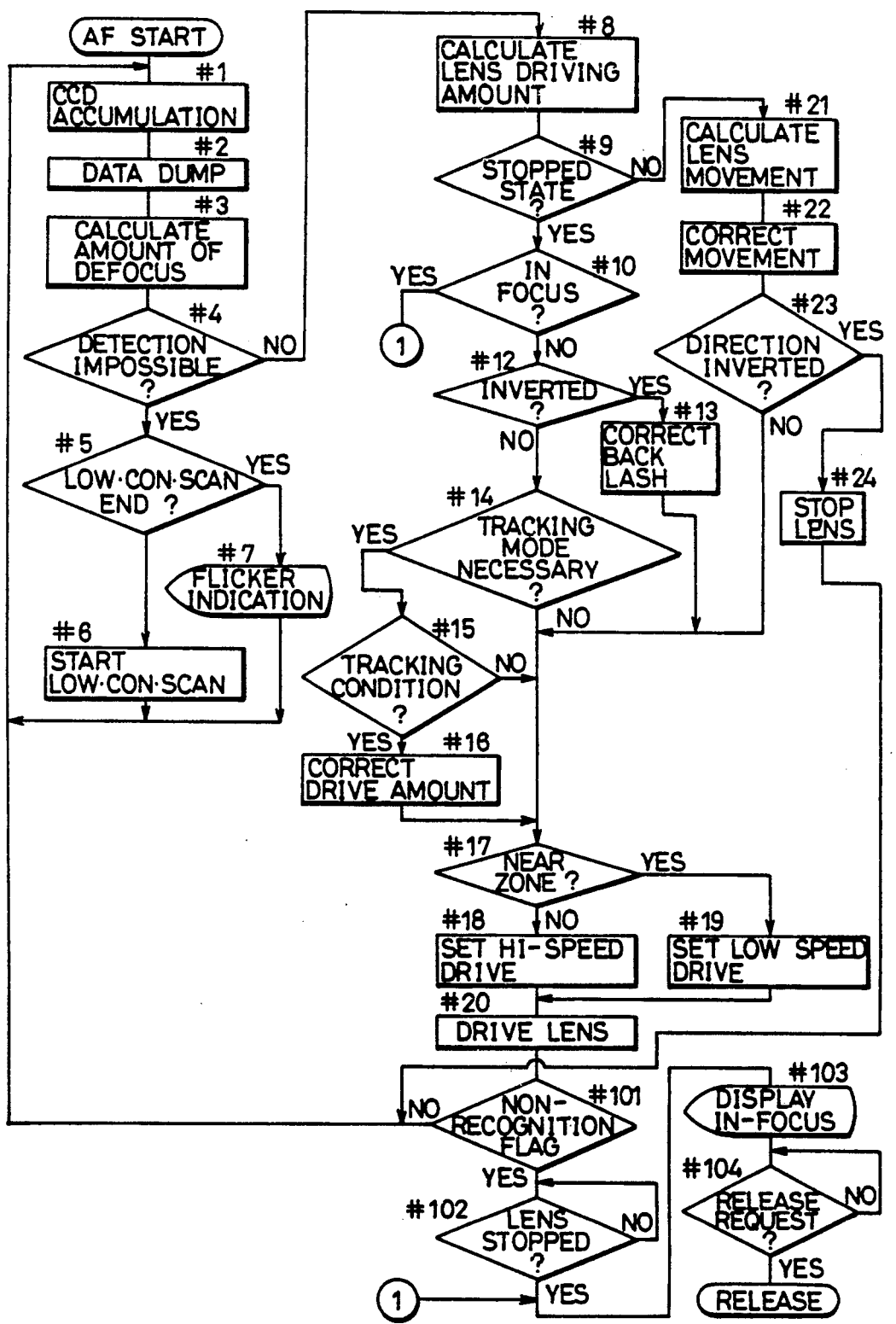
FIG. 1 is a flow chart showing an operation of one embodiment of the present invention.

FIG. 1 shows a flow of a main routine of automatic focus adjustment.

The whole flow of automatic focus adjustment will be described in the following with reference to FIG. 1.

In the step #1, charge accumulation of the CCD image sensor FLM is carried out to accumulate image data of the object in the CCD image sensor. In #2, (hereinafter the term "step" will be omitted) each of the element data from the CCD image sensor FLM is A/D converted to be dumped into the microcomputer 31. In #3, the amount of defocus is calculated. The method for calculating the amount of defocus will be shown later. In #4, whether focus detection is possible or not is determined. If the object is in the low contrast state or an amount of defocus is very large, then it is determined that the focus detection is impossible, and the flow proceeds to #5.

A process for the low contrast state is carried out in the steps #5, #6 and #7. If a lens scanning in order to look for the contrast has not yet been carried out, the lens scanning is carried out and the focus detection is repeated so as to look for the portion having contrast (low contrast scanning). If the object is still in the low contrast state even after the low contrast scanning, it is displayed in #7 that the focus detection is impossible.

If it is determined that the focus detection is possible from the result of calculation in #3, then the program proceeds from the step #4 to #8 where the lens driving amount is calculated. In #9, whether the lens is being kept stopped or not is determined. If it is determined that the lens is kept stopped static state, then whether it is in the in-focus state or not is checked in #10. If it is in the in-focus state, the program proceeds to #103 where the in-focus display is carried out and the program is kept in a waiting state for a release request. If it is in the out-of-focus state in #10, the flow proceeds to the step #12, in which whether the direction of defocus (lens driving direction) calculated in this AF calculation is different from the lens driving direction of the last AF calculation or not is determined. If the lens driving direction is inverted, the program proceeds to #13 where a backlash amount of a lens driving system, which is a cause of error of the lens driving amount when the lens driving direction is inverted, is corrected. If the lens driving direction is not inverted, then the program proceeds to #14. In the step #14, whether or not a tracking is necessary under AF mode (namely, a tracking mode is required to satisfy the automatic focusing) is determined, as will be described in detail later. If the tracking mode is necessary, then the condition or timing for carrying out the tracking correction is determined in #15 (which determination will be described later), and if the conditions are satisfied, the lens driving amount is corrected in #16. The correction of the driving amount will be described in detail later.

If it is determined that the lens is being driven, then the program proceeds to #9 to #21 where the amount of movement of the lens from the object data dump to the end of calculation is calculated (see Japanese Patent Laid Open No. 56-78823), and the correction by this amount of movement is carried out in #22. Although only the correction of the lens moving amount is carried out here, the correction for the movement of the object may be carried out. In #23, the direction in which the lens has been driven is compared with the direction of defocus calculated in this operation (including the correction at the step 22), and if it is determined that the direction is inverted, then the program proceeds to #24, in which the lens is stopped at the next focus detecting operation is carried out and then returns to the step #1. The lens is stopped here, since the result of focus detecting operation is not very reliable when the operation is carried out with the lens moving. If the direction is not inverted, then the program proceeds to #17 to follow the same flow as in the case where the lens was stopped.

In #17, whether the calculated amount of defocus is small or not, i.e., whether the lens is near the in-focus point or not is determined. If the lens is near the in-focus point, then it is determined that the lens is within a near zone and the program proceeds to #19 where the lens is set to be driven at a low speed. If the amount of defocus is large, i.e. the lens is not near the in-focus point, then it is determined that it is out of the near zone, and the lens is set to be driven at a high speed in #18. The driving of lens is started in #20. If the lens was being driven, then the driving is continued.

In #101, in-focus-non-recognized flag is checked. If the flag is not set, then the flow returns to #1. The amount of defocus is calculated at a prescribed timing (#3), the lens driving amount of the present time corresponding thereto is calculated (#8), and the above described flow is again executed.

If the non-recognized flag is set in #101, then the flow is kept in a waiting state until the lens is stopped in #102. Upon stopping of the lens, the in-focus display is given in #103 and the flow is kept in a waiting state until the release switch is pressed, in #104.

<II-2> Calculation of the amount of defocus

Figure 2:
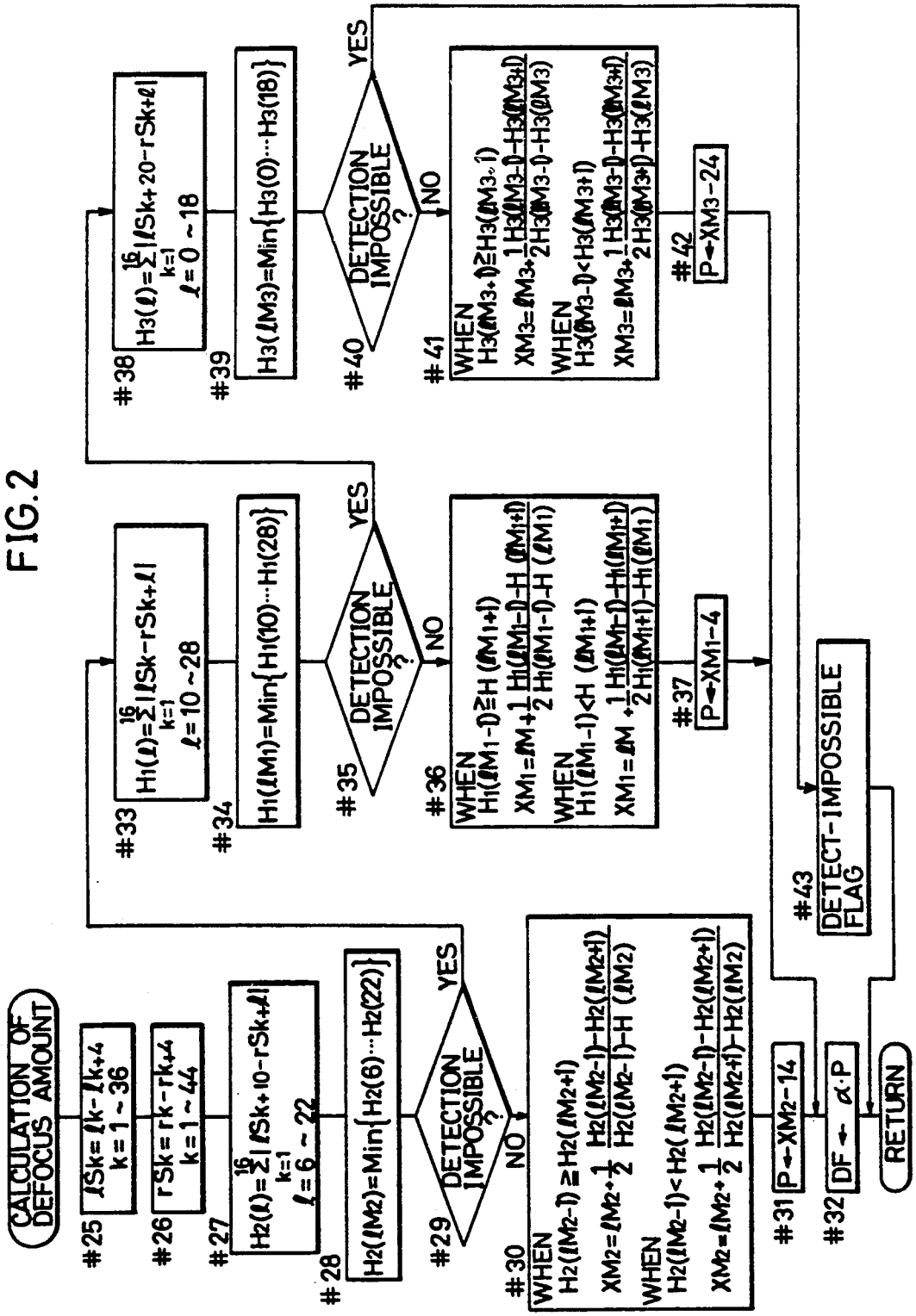
FIG. 2 is a flow chart showing a main operation out of the operation shown in FIG. 1.

The calculation of the amount of defocus carried out in the step #3 of FIG. 1 is shown in FIG. 2.

The principal of the calculation of the defocus amount carried out here is disclosed in detail in Japanese Patent Laid Open No. 59-126517 and No. 60-4914, so that specific processes will be described in the following.

Figures 3, 4:
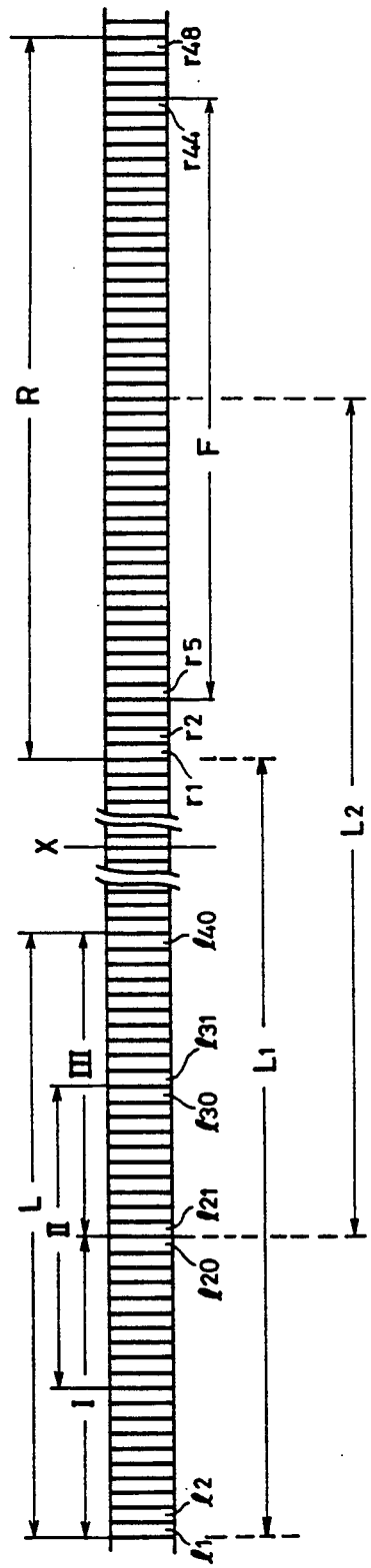
FIGS. 3 to 5 illustrate specific method for implementing the operation shown in FIG. 2.
Figure 5:
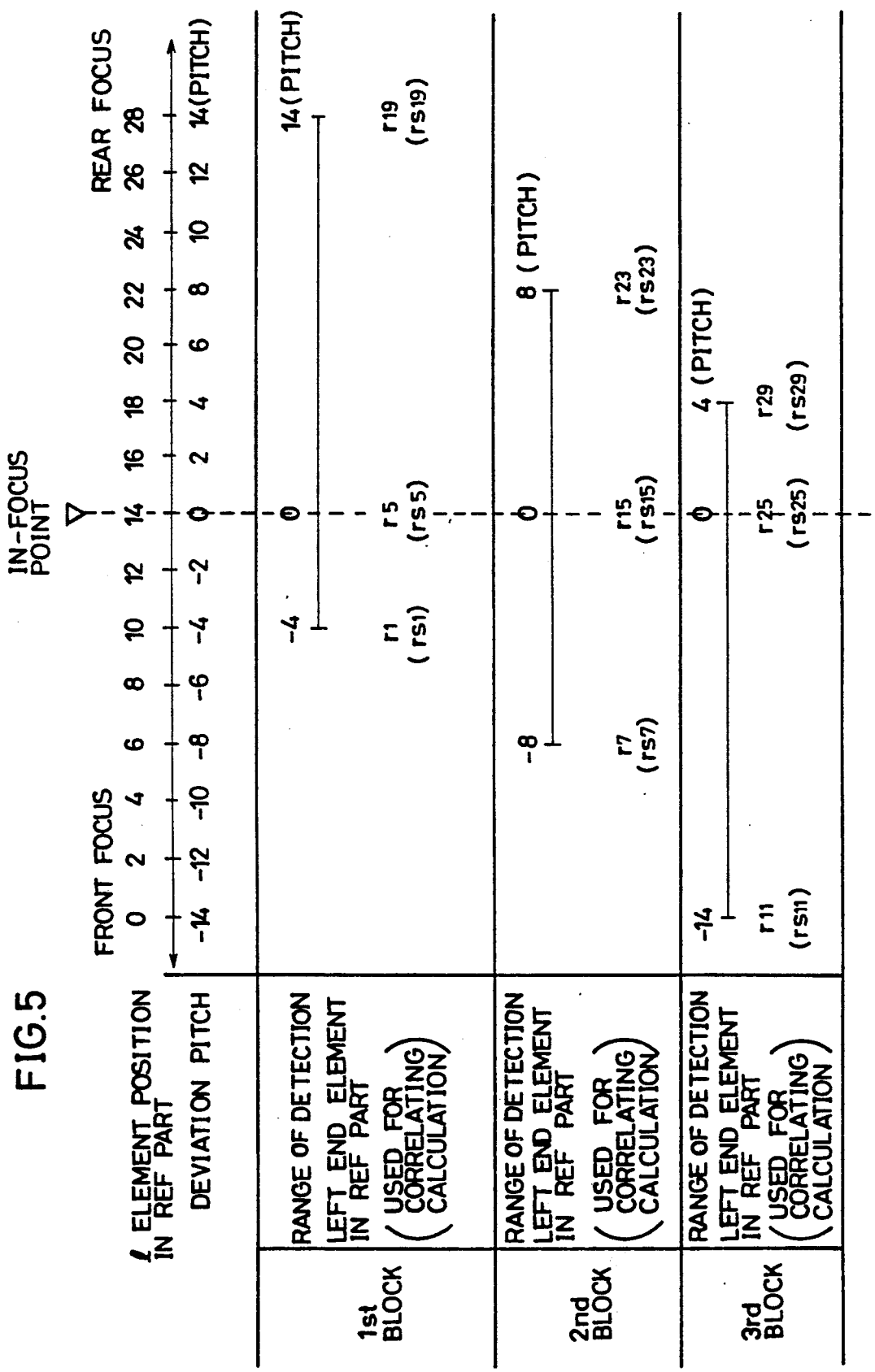

Before the specific description of the flow, the structure of the CCD image sensor FLM will be described. As shown in FIG. 3, the CCD image sensor FLM comprises basic part L including elements $l_1$ to $l_{40}$, a reference part R including elements $r_1$ to $r_{48}$ and an isolating zone sandwiched therebetween. The basic part L comprises a first block I including elements $l_1$ to $l_{20}$, a second block II including elements $l_{11}$ to $l_{30}$ and a third block III including elements $l_{21}$ to $l_{40}$, with the blocks overlapped with each other. A correlating calculation is carried out first on the second block II at the center of the basic part L. If a valid minimum correlation value cannot be found from the result of the correlating calculation on the second block II, then the correlating calculation is carried out on the first block I and then on the third block III. In that case, the deviation between images formed on CCDs detected in each block is partly overlapped, as shown in FIGS. 4 and 5. The method for calculating the amount of defocus will be described with reference to the flow chart of FIG. 2. As shown in FIG. 2, preliminary processing of the object element data is carried out in the steps #25 and #26. Every fourth element differential data $lS_k$ and $rS_k$ are calculated from the element data of the basic part L and the reference part R, respectively. The data processing is carried out in order to provide a kind of low pass filter effect, so as to eliminate focus detecting error derived from unbalance between two images caused by errors in manufacturing the focus detecting optical system. In #27, the relation between the basic part L and the reference parts R in the second block II is calculated, at first. The range of defocus detectable deviation is ±8 element pitches from the in-focus point, which is l=6 to 22 in terms of the element position of the reference part ($rS_{k+l}$) (see FIG. 5). In #28, a function value $H_2$ ($lM_2$) having the highest relation is calculated from the correlating function $H_2$ (l).

In #29, whether the presently carried out correlating calculation is reliable enough to calculate the amount of defocus or not is determined. If it is determined that the detection of the defocus amount is possible, then the program proceeds to #30 in which interpolating calculation is carried out in accordance with the equations shown in the block of #30 to provide the maximum correlating position $XM_2$. By using the highly precisely provided maximum correlating position $XM_2$, the deviation P between images formed on CCDs is calculated in #31 and the amount of defocus DF is calculated by using the deviation P in #32.

If it is determined that the detection is impossible in #29, then the program proceeds to #33 to carry out the correlating calculation in the fist block I. The range of defocus detectable deviation in the first block I is −4 to +14 pitches which is l=10 to 28 in terms of the position of the reference part (see FIG. 5). As in the case of the second block II, the maximum correlating position $lM_1$ is calculated in #34, and whether the detection of the defocus amount is possible or not is determined in #35. If the detection is possible, then the program proceeds to #36 in which the same interpolating calculation as in the step #30 is carried out. However, the term $lM_2$, $XM_2$ and $H_2$ are replaced with the terms $lM_1$, $XM_2$ and $X_1$, respectively. The deviation P between images formed on the CCDs is calculated by using the maximum correlating position $XM_1$ in #37 and the amount of defocus DF is calculated in #32.

If the detection of the defocus amount is impossible in #35, then the program proceeds to #38 in which the correlating calculation in the third block III is carried out. The range of defocus detectable deviation in the third block III is from −14 to +4, which is l=0 to 18 in terms of the element positions of the reference part, as shown in FIG. 5. In the similar manner as in the second and first blocks II and I, the maximum correlating position $XM_3$, the deviation P between images and the amount of defocus DF are calculated (#38, #39, #40, #41 and #42). If it is determined that the detection of the defocus amount is impossible in #40, it means that the calculation of the amount of defocus is impossible in any of the block. Therefore, detection-impossible-flag is set in #43 and the program returns to the step #3 of FIG. 1. This flag is used in the #4 of FIG. 1. If this detection-impossible-flag is set, the program starts the low contrast processing from the step #5.

<II-3> Tracking mode, tracking condition, etc.

Figure 6:
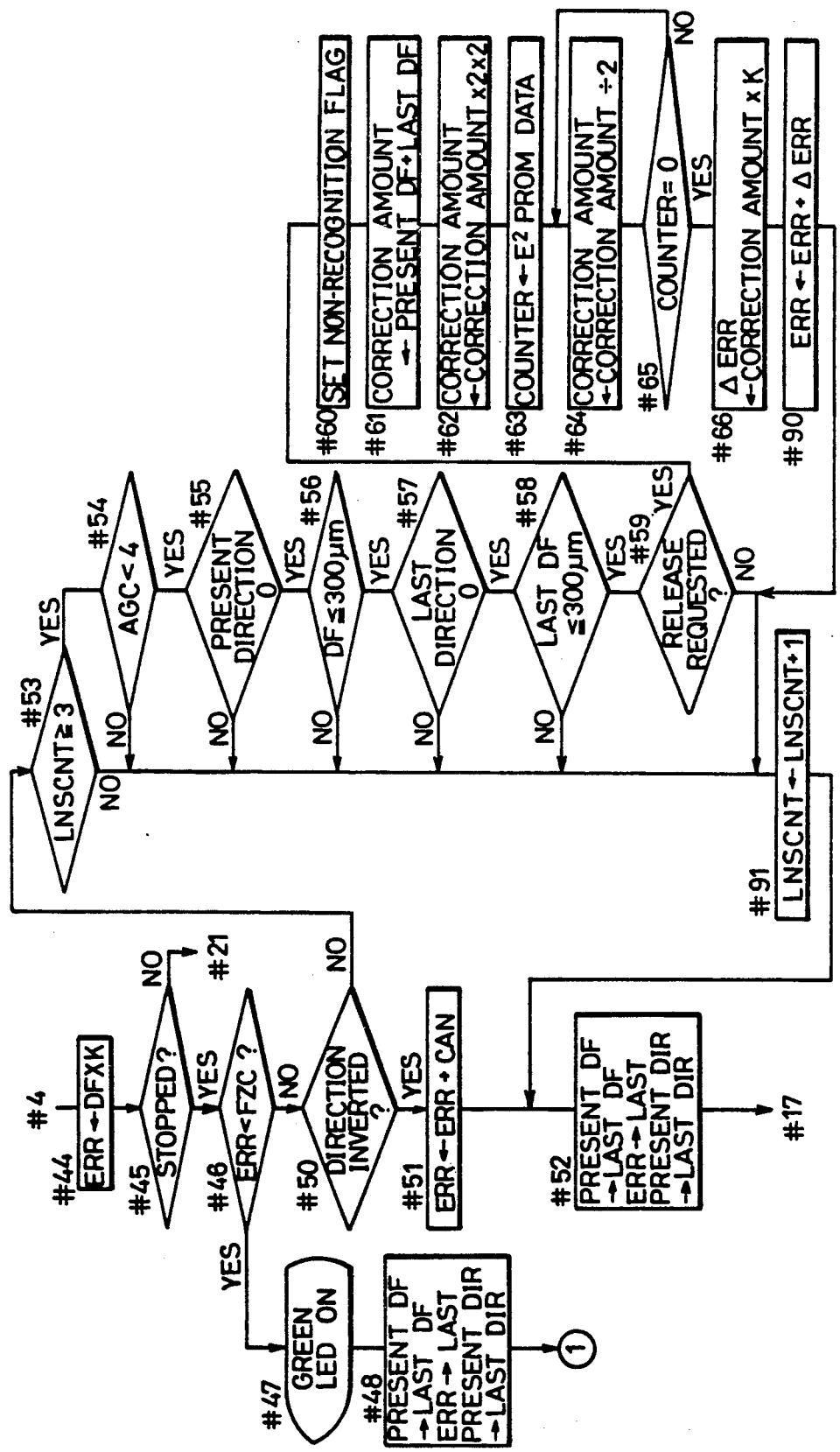
FIGS. 6 to 8 are flow charts showing operation of a main portion of FIG. 1.

FIG. 6 is a flow chart showing in detail the flow from #8 to #16 in FIG. 1, during which the lens is kept stopped. In this embodiment, a tracking mode when the object is coming near to the camera will be described. If it is determined that the amount of defocus can be detected in #4 of FIG. 1, then the program proceeds to #44 of FIG. 6, in which the calculated defocus amount DF is multiplied by a converting coefficient K (K=KL·KB), and a driving pulse number ERR of the encoder corresponding to the lens driving amount (hereinafter simply referred to as the lens driving amount ERR) is calculated (ERR=DF·K). Whether the lens is moving or not is determined in #45. If the lens is moving, then the program proceeds to the step #21 of FIG. 1 and otherwise the flow proceeds to #46. In #46, the lens driving amount ERR is compared with a predetermined amount FZC representing a width of in-focus area. If ERR<FZC and it is determined to be in-focus state, then the program proceeds to #47 in which a green LED is turned on to indicate the in-focus state. In #48, the lens driving amount ERR which is the result of the present calculation and the present direction of defocus are set as LAST and the last direction to be maintained for the next focus detecting loop.

If it is determined that it is not in the in-focus state in #40, then the program proceeds to #50 in which whether the direction in which the lens has been driven and the present defocus direction are the inversion of each other or not. If the present defocus direction is inverted with respect to the lens driving direction, then the program proceeds to #51 in which the backlash amount CAN of the lens driving mechanism is corrected for the present lens driving amount ERR. In #52, the corrected lens driving amount ERR and the defocus direction are stored as in the step #48, and the program proceeds to #17 of FIG. 1.

If the direction is not inverted in #50, then the program proceeds to #53 in which whether the tracking mode is possible or not is determined. Thereafter, in the steps #54 to #59, whether the object is moving toward the camera or not, whether there is a tracking delay or not, and whether the tracking conditions are satisfied or not are determined. In #53, whether the number of lens drive LNSCNT is no less than 3 or not is determined. If the number is three or more, then the program proceeds to the flow of moving object determination. The reason for this is that the number of lens drive up to 2 may be derived from driving of the lens for absorbing the backlash amount of the lens or from an error in the automatic focusing operation when the amount of defocus is very large. In #54, the gain AGC to be multiplied with the output of the CCD image sensor FLM is checked. If the brightness is high with the gain AGC is smaller than four, then the tracking correction is effective. However, if the gain is no less than four, the brightness is too low and the noise of the CCD image sensor FLM becomes too large to carry out proper correction. Therefore, the program goes out of the tracking flow. This condition may be checked by the time of accumulation of the sensor. In #55, the result of the present calculation is checked, and if the direction of defocus is determined to be 0 (i.e., rear focus), it is determined that the object is moving toward the camera.

In #56, whether the amount of defocus resulting from the present calculation is no more than 300 μm or not is determined. The tracking correction is carried out only when the amount is no more than 300 μm. The reason for this is that the erroneous detection of the object determination should be prevented. Namely, it is considered that an abrupt change in the amount of defocus is caused not by the movement of the object but a shake of the camera or some different object crossing in front of the object to be photographed. Therefore, a limit for the tracking correction is set.

In #57, the last direction of defocus is checked. Whether the direction is toward the camera or not is determined. In #58, whether the last amount of defocus is no more than 300 μm or not is determined. In #59, whether there is a release request or not, namely, whether the $S_2$switch of FIG. 9 is pressed or not is checked.

If the switch $S_2$ is pressed, then the program proceeds to #60 to carry out the tracking correction. If the switch $S_2$ is not pressed, then the program proceeds to #91 in which the number of lens drive LNSCNT is incremented by +1, and the program proceeds to #52.

In the flow of the tracking correction starting from the step #60, at first a non-recognition flag is set from the following reason. Namely, if it is detected that the object is moving when the release is requested, the program enters the tracking correction, then the in-focus indication is immediately given after the end of the lens drive without recognizing if the lens is in-focus state or not (in the step #101, the flow directly proceeds to #102 and not to #1) to permit releasing.

In #61, the presently calculated amount of defocus is added to the last amount of defocus, and the resulting amount is multiplied by 4 in #62 for correcting driving. In #63, a value stored in the EEPROM (which is determined when the camera is assembled to be forwarded) is set in the counter. In #64, the correcting amount is again divided by two, which correction is carried out until the contents of the counter becomes 0. Since the amount of correction for tracking is determined for every unit of defocus (μm), so that the amount of correction is multiplied by K as in the step #44 to calculate the correcting amount ΔERR in terms of the lens driving amount in the step #66.

In #90, the amount ΔERR is added to the calculated lens driving amount ERR to provide the present driving amount ERR.

Figure 7:
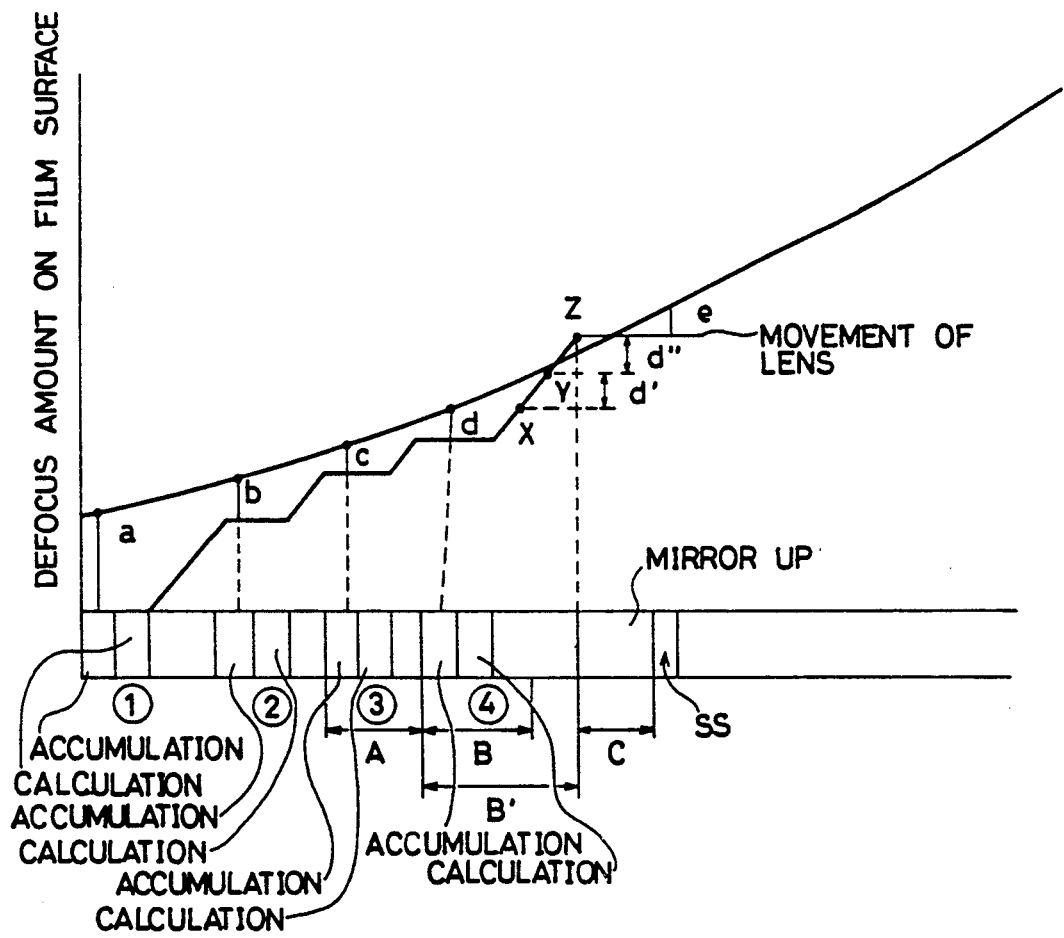

The tracking correction will be described in the following with reference to FIG. 7. In the tracking correction, the charge accumulation of the CCD, the focus detecting calculation and the driving of lens are carried out repeatedly. In FIG. 7, the abscissa represents time and the ordinate represents the amount of defocus on the film surface in terms of the movements of the object and the lens. In this case the object is moving toward the camera. The tracking correction is carried out at the point ④ of the focus detecting operation after three times of accumulation and three times of driving of the lens, as shown in the flow of FIG. 6. Although the AF operation is carried out in the respective focus detecting operation ① to ③, it is not in the in-focus state when confirmed. Therefore, the driving of the lens is repeated and the amount of defocus at the stage ④ is d. Even if the lens is driven by the amount d, the lens is moved at most to the point X and it is still out of focus. Now, when we consider a period including the accumulation, the focus detecting operation and the driving of the lens as one cycle, then the period A at the stage ③ can be regarded as approximately the same as the period B at the stage ④ (provided that the movement of the object on the film surface is linear). Therefore, assuming that the object is moving at a constant speed, the amount of defocus d' after the driving of the lens in the focus detecting operation ④ can be expected as d'=d in the next one period B. When the lens is driven by this amount based on the expectation, the lens is moved to the point Y. Therefore, in order to bring the lens into the in-focus point, the amount of correction is provided by adding the present amount of defocus d. However, since the lens has to be placed at the in-focus point during exposure after the releasing operation, a delay in time such as a release time lag derived from mirror lifting operation and so on must be taken into consideration. By designing this time period as an AF period $A \approx B \approx B' \approx C$, the expected amount of defocus d" generated in the release time lag can be considered as $d'' \approx d$. Therefore, the amount of correction will be 2d. However, there is a possibility that the amount d is not reliable due to a fluctuation in the focus detecting calculation. Therefore, by employing the last defocus data c, an average data (d+c) is used as the amount of tracking correction, in order to reduce the possible error. Therefore, sum of the amount of the defocus calculated in the last operation and the present operation is calculated to be used as the amount of correction, in the step #61.

Now, the amount of correction is multiplied by 4 in #62 and it is divided by 2 for n times in #64, since the release time lag varies widely in different cameras. In addition, in view of the fact that if the speed of the object is constant, the speed on the film surface increases in proportion to the speed of the object and that the speed of the object may not be always constant, the correcting coefficient should preferably be determined corresponding to the type of the camera.

Ideally, n may be n=2. In a camera used only for photographing an object moving at high speed, n may be n=1. In taking photograph of an object which moves to and fro, n may be 3 or 4 so as to set the amount of correction smaller. The EEPROM is adopted to store the number n.

Figure 8:
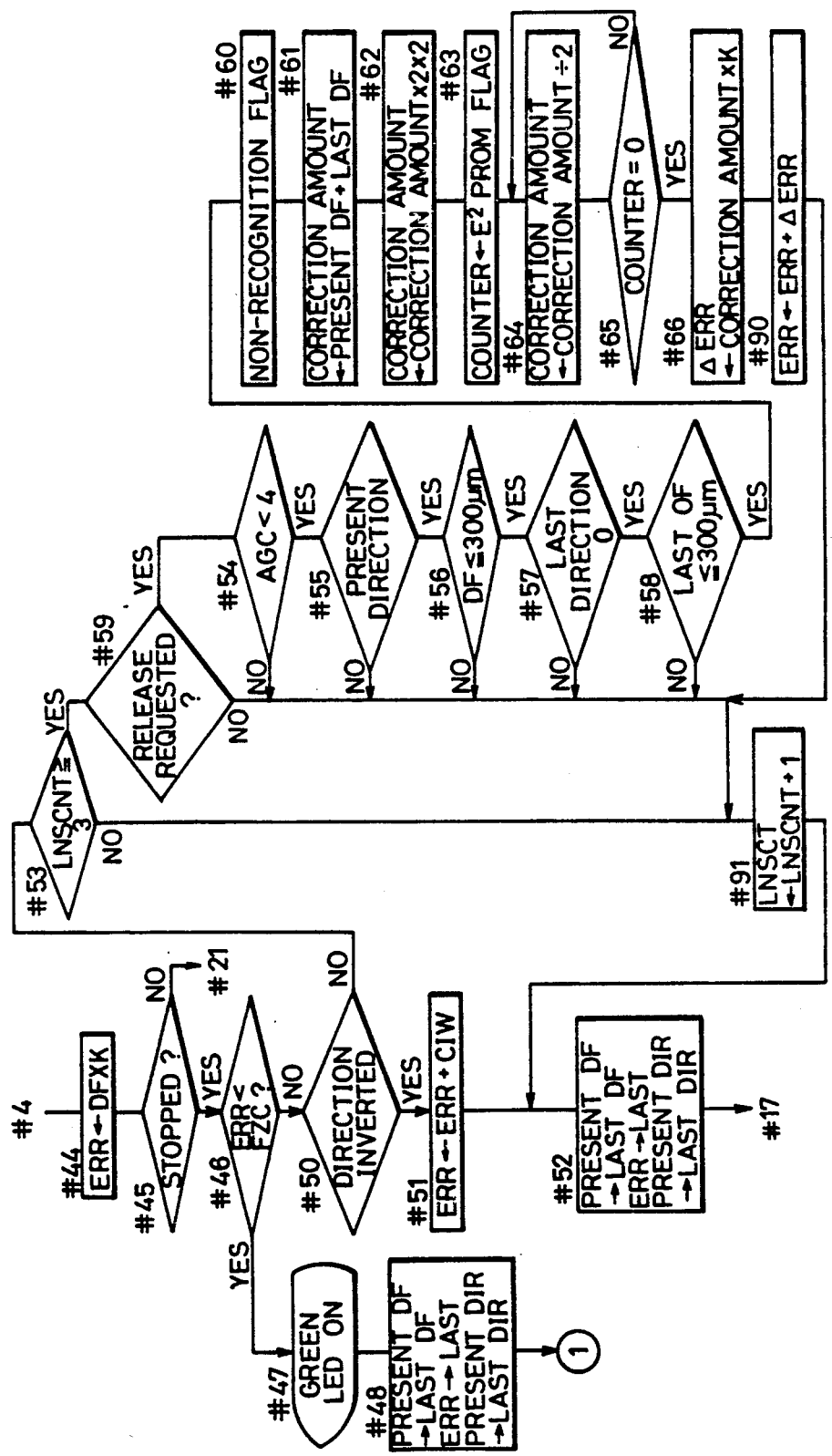

In the present embodiment, the determination of the moving object is carried out even if there is no release request, and the correction of the moving object is carried out after the release request. The determination and correction of the moving object may be carried out after the release request, as shown in FIG. 8.

An embodiment in which the object is moving toward the camera has been described with reference to FIG. 7 or 8. By changing the method of checking direction in the steps #55 and #57, the flow of FIG. 7 or 8 can be applied to the object which is moving toward and away from the camera.

The flow after the releasing operation is omitted. Since cameras to which the present invention is applied are single lens reflex cameras having a focal plane shutter, the photographing operation is carried out in the following manner. Namely, the main mirror 108 is lift up, a preceding shutter curtain of the focal plane shutter is started to travel, exposure is carried out, the trailing shutter curtain is started to terminate the exposure. Thereafter, the main mirror 108 is lowered and cocking of the shutter mechanism is carried out, thus finishing the photographing operation.

As described above, in the present invention, if the object is moving, the correction and driving of the lens corresponding to the movement of the object are carried out until the exposure is actually started in response to a shutter releasing operation, even if the lens is once brought into the in-focus state and the AF lock is carried out. Therefore, in an one shot AF type camera having automatic focus adjusting apparatus, the in-focus state can be realized in exposure by sufficiently tracking the moving object.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera having an automatic focus adjusting apparatus, comprising:

(a) focus detecting means for detecting a focusing condition of a photographic lens to output a focus signal;

(b) movement detecting means for detecting movement of an object and for outputting movement information;

(c) calculating means for predicting an in-focus lens position at a time of exposure control based on said focus signal and said movement information, and for calculating a predicted amount of drive for driving the photographic lens to the in-focus position;

(d) driving means for driving said photographic lens;

(e) determining means for determining whether the amount of drive by said driving means has reached the predicted amount of drive;

(f) a manual operating member;

(g) releasing means for performing a releasing operation independent of said focus detection, when said determining means determines that the amount of drive by said driving means has reached said predicted amount of drive after said manual operating member is operated; and (h) exposure controlling means for starting exposure controlling operation after the releasing operation of said releasing means.

2. A camera having automatic focus adjusting apparatus, comprising:

(a) focus detecting apparatus for detecting focusing condition of a photographic lens to output a focus signal;

(b) driving means for driving said photographic lens;

(c) manual operating member for starting releasing operation;

(d) moving object determining means for determining based on said focus signals whether an object is moving when said manual operating member is manually operated;

(e) calculating means for estimating an in-focus lens position at the time of exposure control;

(f) determining means for determining whether to drive said photographic lens to said estimated in-focus position based on said determining by said moving object determining means;

(g) driving control means responsive to said determining means for controlling said driving means to drive said photographing lens to the estimated in-focus lens position;

(h) releasing means, responsive to completion of operation of said drive control means, for performing a releasing operation after the operation of said operating member; and (i) exposure controlling means for starting exposure controlling operation after said releasing operation.

3. A camera according to claim 2, wherein
said estimated in-focus point corresponds to a point at which said exposure controlling means starts exposure controlling operation.

4. A camera having automatic focus adjusting apparatus, comprising:

(a) focus detecting means for detecting focusing condition of a photographic lens to output a focus signal;

(b) driving means for driving said photographic lens;

(c) manual operating member for starting releasing operation;

(d) moving object determining means for determining based on the focus signal whether an object is moving;

(e) calculating means for estimating an in-focus lens position at the time of exposure control;

(f) drive control means for controlling said driving means to drive said photographic lens to said estimated in-focus lens position;

(g) control means for making operable said drive control means only after the operation of said operating member;

(h) releasing means, responsive to completion of operation of said drive control means, for performing a releasing operation after the operation of said operating member; and (i) exposure controlling means for starting exposure controlling operation after said releasing operation.

5. A camera according to claim 4, wherein
said estimated in-focus point corresponds to a point at which said exposure controlling means starts exposure controlling operation.

6. A camera having an automatic focus adjusting apparatus, comprising:

(a) focus detecting means for detecting focusing condition of a photographic lens to output a focus signal;

(b) calculating means for estimating an in-focus lens position at the time of exposure control;

(c) driving means for driving said photographic lens;

(d) manual operating member for starting releasing operation;

(e) focus lock means for inhibiting operation of said driving means;

(f) drive control means for controlling said driving means such that when said operating member is operated and said focus lock means is inoperative, said photographic lens is driven to said estimated in-focus lens position;

releasing means, responsive to completion of operation of said drive control means, for performing a releasing operation after operation of said manual operating member; and (g) exposure controlling means for starting controlling exposure operation after said releasing operation of said releasing means 7. A camera according to claim 6, further comprising:
inhibiting means for inhibiting exposure control when an amount of defocus is equal to or more than a predetermined value upon the manual operation of said manual operating member.

8. A camera according to claim 6, further comprising:
inhibiting means for inhibiting the operation of said driving means due to the corrected amount of lens drive when the amount of defocus is equal to or more than the predetermined value upon the manual operation of said manual operating member.

9. A camera according to claim 6, further comprising:
inhibiting means for inhibiting the operation of said correcting means when the amount of defocus is equal to or more than the predetermined value upon the manual operation of said manual operating member.

10. A camera having an automatic focus adjusting apparatus comprising:

(a) focus detecting means for detecting focusing condition of a photographic lens to output a focus signal;

(b) calculating means for calculating based on the detected focusing condition the driving amount said photographic lens is to be driven to an in-focus point;
(c) driving means for driving said photographic lens;
(d) a manual operating member for starting releasing operation;
(e) movement determining means for determining whether an object is a moving object;
(f) drive control operating means for driving said driving means when said operating member is operated and an object is determined to be a moving object by said movement determining means;
(g) determining means for determining whether the amount of driving by said driving means has reached said calculated driving amount;

(h) releasing means for performing a releasing operation independent of said focus detection, when the amount of driving by said driving means reaches said calculated driving amount; and
(i) exposure controlling means for starting exposure controlling operation after the releasing operation of said releasing means.

11. A camera according to claim 10, wherein said calculating means includes correcting means for correcting the calculated amount of lens drive in accordance with the movement of the object.

12. A camera having an automatic focus adjusting apparatus according to claim 6, wherein said focus lock means operates when in-focus state is detected by said focus detecting means.

* * * * *

UNITED STATES PATENT AND TRADEMARK OFFICE
CERTIFICATE OF CORRECTION

PATENT NO. : 5,144,355

DATED : September 1, 1992

INVENTOR(S) : Masataka HAMADA et al

It is certified that error appears in the above-identified patent and that said Letters Patent is hereby corrected as shown below:

On title page, add the following;

"Related U.S. Application Data

[63] Continuation of Ser. No. 352,289, May 15, 1989, abandoned."

Signed and Sealed this

Fifth Day of October, 1993

Attest:

BRUCE LEHMAN

Attesting Officer

Commissioner of Patents and Trademarks